United States Patent
Yang et al.

(10) Patent No.: US 11,249,972 B2
(45) Date of Patent: Feb. 15, 2022

(54) INDEX UPDATE METHOD AND SYSTEM, AND RELATED APPARATUS

(71) Applicant: Huawei Technologies Co., Ltd., Shenzhen (CN)

(72) Inventors: Yidong Yang, Nanjing (CN); Chenghua Liu, Shenzhen (CN); Yong Deng, Nanjing (CN); Wenqi Zhu, Nanjing (CN); Bingjian Hou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 136 days.

(21) Appl. No.: 16/718,638

(22) Filed: Dec. 18, 2019

(65) Prior Publication Data

US 2020/0272614 A1     Aug. 27, 2020

Related U.S. Application Data

(63) Continuation of application No. PCT/CN2018/083577, filed on Apr. 18, 2018.

(30) Foreign Application Priority Data

Jun. 19, 2017 (CN) .......................... 201710464640.1

(51) Int. Cl.
    *G06F 16/22*      (2019.01)
    *G06F 16/27*      (2019.01)
    *G06F 16/23*      (2019.01)

(52) U.S. Cl.
    CPC ........ *G06F 16/2272* (2019.01); *G06F 16/235* (2019.01); *G06F 16/2329* (2019.01); *G06F 16/2343* (2019.01); *G06F 16/273* (2019.01)

(58) Field of Classification Search
    CPC .. G06F 16/22; G06F 16/2272; G06F 16/2343; G06F 16/235; G06F 16/2329;
(Continued)

(56) References Cited

U.S. PATENT DOCUMENTS

| 7,107,294 B2 | 9/2006 | Romanufa et al. |
| 9,081,805 B1 * | 7/2015 | Stamen ................. G06F 9/5027 |

(Continued)

FOREIGN PATENT DOCUMENTS

| CN | 101136016 A | 3/2008 |
| CN | 101650741 A | 2/2010 |

(Continued)

OTHER PUBLICATIONS

Anonymous, "The Force.com Multitenant Architecture," XP055373747, Mar. 2016, 19 pages.

*Primary Examiner* — James E Richardson
(74) *Attorney, Agent, or Firm* — Conley Rose, P.C.

(57) ABSTRACT

An index update method, including: receiving an index update request, where the index update request is used to instruct to create or delete a target index that is associated with a field in a logic table of a tenant; updating metadata information of the logic table in a database in response to the index update request; notifying a coordination service, where the coordination service is used to notify a second data access node to perform a local synchronization update; and after all second data access nodes finish local synchronization updates, performing a data asynchronization update. After the metadata information is updated in the database, an index is updated in two steps. In a first step, a local synchronization update is performed. In a second step, after all data access nodes finish local synchronization updates, a data asynchronization update is performed.

20 Claims, 9 Drawing Sheets

(58) Field of Classification Search
CPC .... G06F 16/2393; G06F 16/256; G06F 16/27; G06F 16/273; G06F 16/275
See application file for complete search history.

(56) References Cited

U.S. PATENT DOCUMENTS

| | | | |
|---|---|---|---|
| 10,747,739 B1* | 8/2020 | Muniswamy Reddy | G06F 16/2228 |
| 2005/0108199 A1* | 5/2005 | Ellis | G06F 16/24542 |
| 2011/0082854 A1* | 4/2011 | Eidson | G06F 16/24544 707/714 |
| 2012/0030192 A1* | 2/2012 | An | G06F 16/213 707/717 |
| 2012/0173589 A1* | 7/2012 | Kwon | G06F 16/2282 707/803 |
| 2015/0339359 A1 | 11/2015 | Takaoka et al. | |
| 2016/0357740 A1 | 12/2016 | Deng et al. | |

FOREIGN PATENT DOCUMENTS

| | | |
|---|---|---|
| CN | 102024020 A | 4/2011 |
| CN | 103475721 A | 12/2013 |
| CN | 104603780 A | 5/2015 |
| CN | 104866497 A | 8/2015 |

* cited by examiner

INDEX UPDATE METHOD AND SYSTEM, AND RELATED APPARATUS

CROSS-REFERENCE TO RELATED APPLICATIONS

This application is a continuation of International Application No. PCT/CN2018/083577, filed on Apr. 18, 2018, which claims priority to Chinese Patent Application No. 201710464640.1, filed on Jun. 19, 2017. The disclosures of the aforementioned applications are hereby incorporated by reference in their entireties.

TECHNICAL FIELD

This application relates to the computer field, and more specifically, to a flat-wide table index update technology.

BACKGROUND

In some multi-tenant single-instance architecture scenarios, a flat-wide table is used as storage space for tenant data (that is, a custom object of a tenant). Therefore, the flat-wide table stores tenant data of a plurality of tenants. Certainly, referring to FIG. 1c, a logic table or a service table (for example, an order, an acceptance, and an inventory) instead of a flat-wide table is presented to a user.

As a key data structure in a database system, an index plays an important role in an index update in the database system. Quick access to a record in a physical database table can be implemented by using the index.

However, there is a limitation in an existing index update manner. Indexes can be created only for full table data. This cannot meet a requirement of creating an index on tenant data of a particular tenant, and consequently cannot adapt to a multi-tenant scenario.

For this reason, an index pivot table is introduced and index data in the index pivot table is defined by using metadata, to create an index for a field in a logic table corresponding to the tenant data, and further meet a requirement of creating the index on the tenant data.

However, an existing index update is performed when the system is idle and is not performed online in real time. Therefore, how to update an index online in real time has become a current research and development topic.

SUMMARY

In view of this, embodiments of this application provide an index update method and a related apparatus, so as to update an index online in real time.

To achieve the foregoing objective, the embodiments of this application provide the following technical solutions.

According to one aspect, an embodiment of this application provides an index update method, including: receiving, by a first data access node, an index update request, where the index update request is used to instruct to create or delete a target index that is associated with a logic table of a tenant; updating, by the first data access node, metadata information of the logic table in a database in response to the index update request, and notifying a coordination service that the metadata information of the logic table is changed, where the coordination service notifies a second data access node to perform a local synchronization update on the metadata information of the logic table; in addition, performing, by the first data access node, a local synchronization update on the metadata information of the logic table; and after all second data access nodes finish local synchronization updates, performing, by the first data access node, a data asynchronization update. It can be learned that in this embodiment, after the metadata information is updated in the database, an index is updated in two steps: In a first step, each data access node performs a local synchronization update on the metadata information of the logic table. After the local synchronization update, a subsequent data access request of each data access node for the logic table may be based on new metadata information. In a second step, after all the data access nodes finish the local synchronization updates, a data asynchronization update is performed to create or delete the target index. The index can be updated online in real time through the foregoing two-step update.

In a possible design, after receiving the index update request and before updating the metadata information, the first data access node further adds a table lock to the logic table, where the table lock is used to prohibit another request from being used to perform an update operation on the metadata information of the logic table, and the another request herein is a request related to performing the update operation on the metadata information of the logic table. However, after completing the data asynchronization update, the first data access node releases the table lock. In an actual operation, there may be another index update request that is also used to instruct to create or delete an index for a field on the same logic table, while the table lock may prevent a plurality of requests from being used to simultaneously update the metadata information of the same logic table, to avoid data update confusion.

In a possible design, the local synchronization update may include at least: refreshing the metadata information of the logic table cached locally; and after all transactions in a current transaction list end, notifying the coordination service that the local synchronization update is finished. Notifying the coordination service after the transactions in the current transaction list end may ensure that a current transaction (an ongoing data operation) is not affected.

In a possible design, the "local synchronization update" may further include the following operation: setting a locally cached query plan associated with the logic table to an invalid state. This is because the query plan in this case is generated before the metadata information is updated and is set to the invalid state to prevent a new query request from using the query plan. It should be noted that, although the query plan is made invalid, the transactions in the current transaction list can still use the query plan in the invalid state while a new query request cannot use the query plan in the invalid state.

In a possible design, the updating metadata information of the logic table in a database includes at least: updating a metadata version number of the logic table in the database. Further, for creating the index, updating index metadata information may specifically include: A: storing the index metadata information of the target index into the database, and B: setting a status of the target index to a first intermediate state. Specifically, the first intermediate state may be designed as "creating". An index in the first intermediate state cannot be cited by the query plan. The reason that the status of the target index is set to the first intermediate state is as follows: The index metadata information of the target index is stored in the database in this case, but the target index is not really created successfully. In this case, if the query plan is allowed to cite the target index, a query fails. In addition, the first intermediate state has another function in another embodiment, and the function is subsequently described in this specification. For deleting the index, updating index metadata information may specifically include: setting a status of the target index to a second intermediate state. Specifically, the second intermediate state may be designed as "deleting". More specifically, a status (status) field value in an index metadata table may be set to "deleting", indicating "deleting". An index in the second intermediate state cannot be cited by the query plan, either. The status of the target index is set to the second intermediate state to prevent the query plan from citing an index to be deleted. Whether deleting or creating an index, the first data access node updates a metadata version number of the target logic table in the database. This embodiment provides a specific manner of updating the metadata information of the logic table in the database, to better update an index online.

In a possible design, the data asynchronization update includes at least: creating the target index or deleting the target index according to the index update request. After the target index is created or the target index is deleted, the data asynchronization update further includes: updating a metadata version number in a target tenant data record. For creating the target index, the first data access node may query a tenant data record associated with the target logic table in a flat-wide table, synchronize data in the target tenant data record to the target index, and in addition, update the metadata version number in the target tenant data record. The target tenant data record includes a tenant data record whose metadata version number is not updated and that is associated with the logic table. After the target tenant data record cannot be found, the first data access node sets the status of the target index in the database to a normal state, and notifies the coordination service. The coordination service may notify the second data access node again to refresh the metadata information of the target logic table cached locally again, or refresh only the status of the target index cached locally. For deleting the target index, after the target index is deleted, the data asynchronization update further includes: deleting the index metadata information of the target index in the database, and notifying the coordination service, where the coordination service may notify the second data access node again to refresh the metadata information of the logic table cached locally again.

According to another aspect, an embodiment of this application provides a data access node, and the data access node has a function of implementing behavior of the data access node in the foregoing method design. The function may be implemented by hardware, or may be implemented by hardware by executing corresponding software.

According to still another aspect, an embodiment of this application provides an index update system, including an application node, a database node, and the foregoing data access node. The data access node has a function of implementing behavior of the data access node in the foregoing method design. The function may be implemented by hardware, or may be implemented by hardware by executing corresponding software.

According to yet another aspect, this application provides a computer-readable storage medium, and the computer-readable storage medium stores an instruction. When the instruction runs on a computer, the computer performs the method in the foregoing aspect.

According to still yet another aspect, this application provides a computer program product that includes an instruction. When the computer program product runs on a computer, the computer performs the method in the foregoing aspect.

According to a further aspect, this application provides a chip system. The chip system includes a processor, configured to support an index update apparatus in implementing functions in the foregoing aspects, for example, generating or processing data and/or information in the foregoing method. In a possible design, the chip system further includes a memory, and the memory is configured to store a program instruction and data that are necessary for the data sending device. The chip system may include a chip, or include a chip and another discrete device.

In the solutions provided in this application, after the metadata information is updated in the database, an index is updated in two steps: In a first step, each data access node performs a local synchronization update on the metadata information of the logic table. After the local synchronization update, a subsequent data access request of each data access node for the logic table may be based on new metadata information. In a second step, after all the data access nodes finish the local synchronization updates, a data asynchronization update is performed to create or delete the target index. The index can be updated online in real time through the foregoing two-step update.

DESCRIPTION OF EMBODIMENTS

Figure 1A:
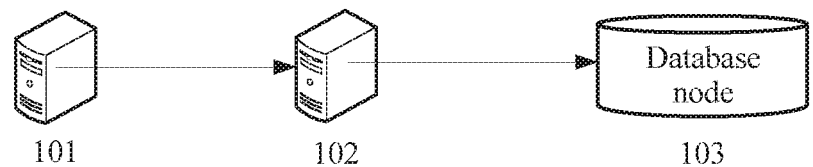
FIG. 1a and FIG. 1b are examples of structural diagrams of an index update system according to an embodiment of this application.

For reference and clarity, technical terms, acronyms, or abbreviations used below are summarized as follows:

SQL: Structured Query Language, structured query language;

DDL: Data Definition Language, data definition language, which is a language used to describe a real-world entity stored in a database management system;

DML: Data Manipulation Language, data manipulation language, which is a language used to operate data in the database management system;

Index: index, which is a data structure sorted in a database management system, to assist in fast query and update data in a database table;

Query Plan: query plan, which is a set of sequential execution steps used to access data in a database management system;

CBO: Cost-Based Optimization, Cost-Based Optimization, which is a database system query plan optimization method; and ID: identifier, identifier.

A multi-tenant single-instance architecture may be applied to a plurality of scenarios. For example, a software as a service (Software As A Service, SaaS) mode. In this mode, an SaaS vendor uniformly deploys application software. A tenant subscribes to an application software service from the vendor through the Internet based on an actual requirement and pays a fee. The tenant no longer needs to build additional IT basic settings of an enterprise, to effectively reduce operation and maintenance costs. In the multi-tenant single-instance architecture, a flat-wide table is used as storage space for tenant data (that is, a custom object of the tenant). For ease of understanding of the technical solutions provided in this application, a flat-wide table model, an object metadata table, and a field metadata table are first described in this specification.

The flat-wide table model is shown in Table 1 below. The flat-wide table model reserves several (for example, 100 or 500) typeless fields as storage fields for tenant data. For example, value0 to value499 in the following table are the foregoing typeless fields. In addition, the flat-wide table model further includes a field that describes basic information about the tenant data, for example, a tenant ID (tenant_id), an object type ID (obj_id), and a global unique identifier (Global Unique Identifier, GUID).

TABLE 1

| Data | Description |
| --- | --- |
| tenant_id | Tenant ID |
| obj_id | Object type ID |
| Guid | Recording a global ID |
| version | Version number |
| delete_time | Deletion time |
| value0 | Storage object field value |
| value1 | Typeless, variable-length type, and character-string type |
| value2 | |
| ... | |
| value499 | |

In addition, the tenant data is defined by using a set of metadata tables. Main metadata tables include an object metadata table and a field metadata table. An object metadata table model is shown in Table 2 below. The object metadata table is used to store basic metadata information of the tenant data, including a tenant ID, a name (obj_name), an object type ID, and the like.

TABLE 2

| objects | Description |
| --- | --- |
| obj_id | Object type ID |
| tenant_id | Tenant ID |
| obj_name | Object name |

A field metadata table model is shown in Table 3 below. The field metadata table is used to store field detail information of the tenant data, including a field ID (field_id), a name (field_name), a type (data_type), a size (data_size), a column number of a field in a flat-wide table, and the like.

TABLE 3

| Fields | Description |
| --- | --- |
| field_id | Field ID |
| tenant_id | Tenant ID |
| obj_id | Object type ID |
| field_name | Field name |
| data_type | Field type |
| data_size | Field size |
| field_num | Column number of a field in a flat-wide table |

It is assumed that a tenant 101 customizes an object ACCOUNT (logic table ACCOUNT). An example of an object metadata table of the object ACCOUNT is shown in Table 4 below, and an example of a field metadata table of the object ACCOUNT is shown in Table 5 below. It is assumed that an data object ACCOUNT of the tenant 101 stored in a flat-wide table is shown in Table 6 below.

TABLE 4

| obj_id | tenant_id | obj_name |
| --- | --- | --- |
| 201 | 101 | ACCOUNT |

TABLE 5

| field_id | tenant_id | obj_id | field_name | data_type | data_size | field_num |
| --- | --- | --- | --- | --- | --- | --- |
| 301 | 101 | 201 | ACCOUNT_ID | int | 4 | 0 |
| 302 | 101 | 201 | ACCOUNT_NAME | varchar | 16 | 1 |
| 303 | 101 | 201 | ADDRESS | varchar | 256 | 2 |

TABLE 6

| tenant_id | obj_id | Guid | version | delete_time | value 0 | value 1 | value 2 |
| --- | --- | --- | --- | --- | --- | --- | --- |
| 101 | 201 | 1000001 | V1 | null | ACCID_1 | Tom | Nanjing |
| 101 | 201 | 1000002 | V1 | null | ACCID_2 | Jack | Shanghai |
| 101 | 201 | 1000003 | V1 | null | ACCID_3 | Mary | Beijing |
| 101 | 201 | 1000004 | V1 | null | ACCID_4 | Penny | Hongkong |

It can be learned that customizing a data object by the tenant, for example, adding or deleting a field or changing a type, may no longer be implemented based on a DDL operation on a physical table of a physical database, but may be implemented by using a DML operation on metadata. The tenant may arbitrarily modify an object definition of the tenant without affecting another tenant.

It should be noted that, although the tenant data is stored in the flat-wide table, a user does not see the flat-wide table, but a logic table or a service table (for example, an order table, an acceptance table, and an inventory table). For example, for the data object ACCOUNT of the tenant 101 in the flat-wide table mentioned above. Referring to FIG. 1c, a user sees an account logic table.

If there is a need to query an ID, a name (name), and an address (address) in all records with a name "ABC" in the account logic table, an example of a logical SQL statement of the query operation is as follows:
SELECT ACCOUNT_ID, ACCOUNT_NAME, ADDRESS
FROM ACCOUNT
WHERE ACCOUNT_NAME='ABC'.

Logical SQL access of the tenant based on a custom data object may be finally converted, by using metadata description information, into physical SQL access based on a data flat-wide table. As a key data structure in a database system, an index plays an important role in query optimization in the database system. Quick access to a record in a physical database table can be implemented by using the index. As mentioned above, there is a limitation in an existing index update manner. Indexes can be created only for full table data. This cannot meet a requirement of creating an index on tenant data of a particular tenant, and consequently cannot adapt to a multi-tenant scenario.

For this reason, an index pivot table is introduced to meet the requirement of creating the index on the tenant data of the particular tenant. Structures of the index pivot table are shown in Table 7 and Table 8 below, and respectively support a non-unique index and a unique index.

String_value, num_value, and date_value fields of an index pivot table respectively store a character string, a number value, and a date type field value, and a non-unique index is created on these fields. A unique index is created on these fields of a unique index pivot table.

TABLE 7

| Index pivot table | Description |
| --- | --- |
| tenant_id | Tenant ID |
| obj_id | Object type ID |
| field_num | Column number of a field in a flat-wide table |
| Guid | Recording a global ID |

TABLE 7-continued

| Index pivot table | Description |
| --- | --- |
| string_value | Character string value |
| num_value | Number value |
| date_value | Date value |

TABLE 8

| Unique index pivot table | Description |
| --- | --- |
| tenant_id | Tenant ID |
| obj_id | Object type ID |
| field_num | Column number of a field in a flat-wide table |
| Guid | Recording a global ID |
| string_value | Character string value |
| num_value | Number value |
| date_value | Date value |

In addition, data in the index pivot table is further defined by using a set of metadata tables, and the metadata tables include an index metadata table (indexes) and an index field table (index_fields). A model of the indexes is shown in Table 9 below, and a model of the index_fields is shown in Table 10 below.

TABLE 9

| Indexes | Description |
| --- | --- |
| index_id | Index ID |
| tenant_id | Tenant ID |
| obj_id | Object type ID |
| index_name | Index name |
| index_type | Index type |
| status | Index status |
| create_time | Creation time |
| update_time | Update time |

TABLE 10

| index_fields | Description |
| --- | --- |
| index_id | Index ID |
| tenant_id | Tenant ID |
| obj_id | Object type ID |
| field_id | Field ID |

For example, it is assumed that the data object ACCOUNT data object of the tenant 101 stored in the flat-wide table is shown in Table 6. In this application, if the tenant specifies to create a non-unique index for a field ACCOUNT_NAME of the object ACCOUNT, the index metadata table (indexes) is shown in Table 11 below, and an index pivot table is shown in Table 12 below.

TABLE 11

| index_id | tenant_id | obj_id | index_name | index_type | status | create_time | delete_time |
| --- | --- | --- | --- | --- | --- | --- | --- |
| 401 | 101 | 201 | INDEX_ACCOUNT | Non-unique | created | 00:00:00, 2016 Sep. 26 | null |

TABLE 12

| tenant_id | obj_id | field_num | Guid | string_value | num_value | date_value |
| --- | --- | --- | --- | --- | --- | --- |
| 101 | 201 | 0 | 1000001 | ACCID_1 | Null | Null |
| 101 | 201 | 0 | 1000002 | ACCID_2 | Null | Null |

TABLE 12-continued

| tenant_id | obj_id | field_num | Guid | string_value | num_value | date_value |
|---|---|---|---|---|---|---|
| 101 | 201 | 0 | 1000003 | ACCID_3 | Null | Null |
| 101 | 201 | 0 | 1000004 | ACCID_4 | Null | Null |

It should be noted that the object metadata table, the field metadata table, the index metadata table, and the index field table all belong to metadata information of the logic table. For example, Table 4, Table 5, Table 11, and Table 12 all belong to metadata information of the account logic table, and in addition, the metadata information of the logic table further includes a metadata version number.

Embodiments of this application provide an index update method and a related apparatus (an update apparatus, a data access node, and an index update system), to resolve a limited index creation problem, for example, in an index update manner, there is a specific limitation in aspects of a field type and an index type, so that a tenant can flexibly specify a field to create an index on the field, and in an online index creation process, an ongoing data operation is not affected.

Referring to FIG. 1a, the foregoing index update system may include an application node 101, a data access node 102, and a database node 103 (which stores tenant data). In an example, the index update system may be specifically an SaaS application system.

Figure 1B:
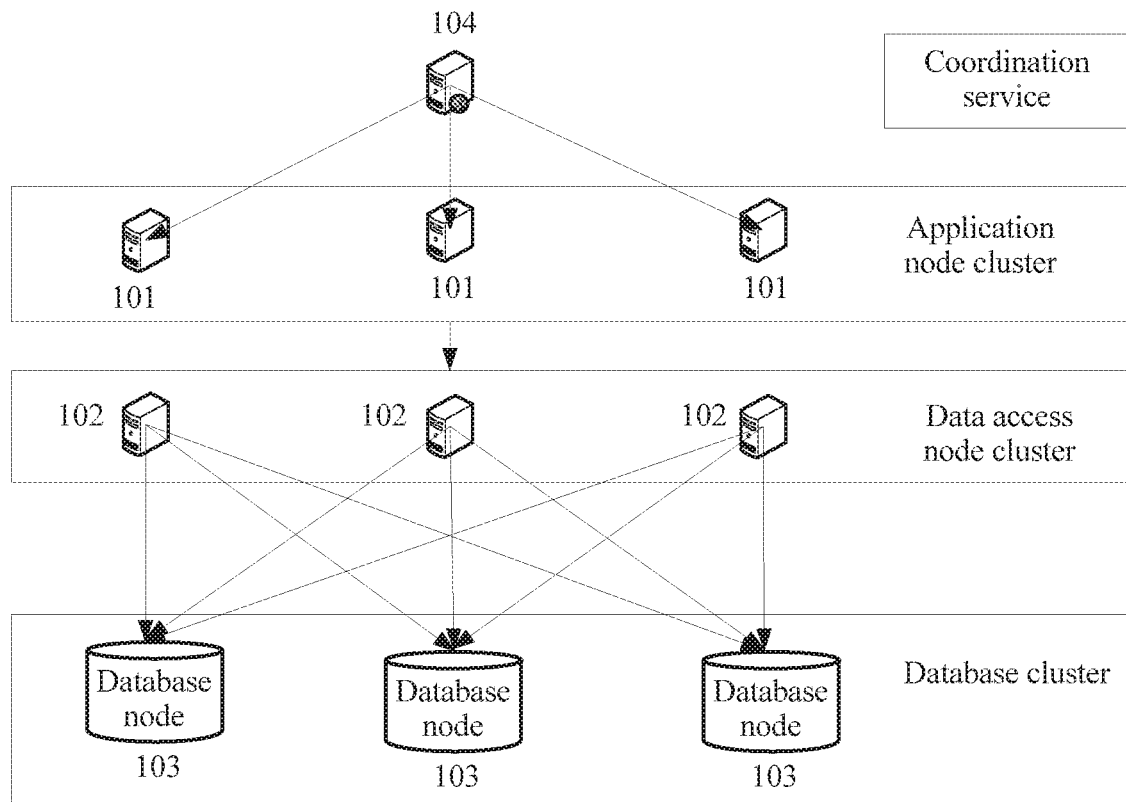
Figure 1C:
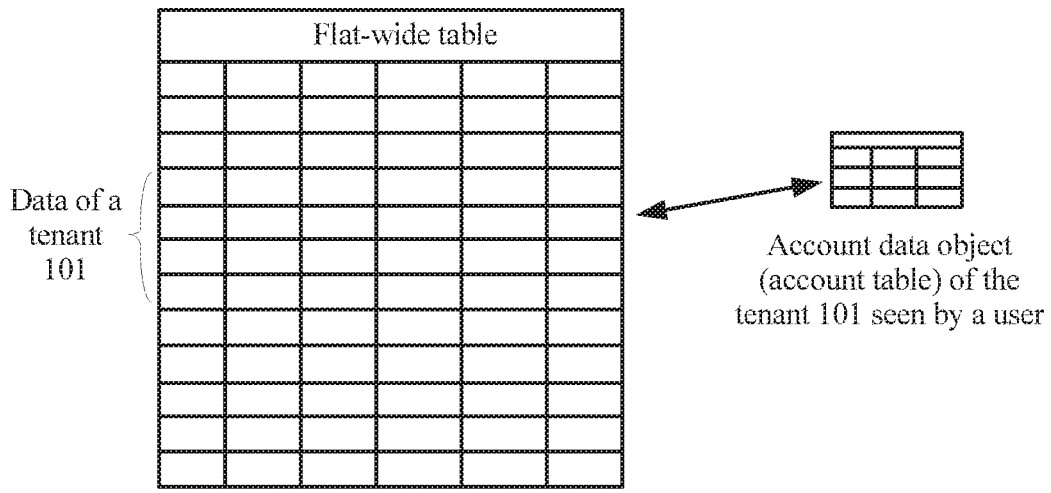
FIG. 1c is a schematic diagram of a relationship between a logic table and a flat-wide table according to an embodiment of this application.

The application node 101 is mainly responsible for running a business service of the index update system. In a large-capacity scenario, referring to FIG. 1b, cluster deployment may be used. The data access node 102 is mainly responsible for running a database access service of the index update system and providing a standard SQL interface, and may accept a database access request of the application node 101, submit a database query (query plan) to the database node 103, and return a result to the application node 101. In the large-capacity scenario, referring to FIG. 1b, the cluster deployment may be used. In addition, the data access node 102 may further perform an index update method provided in this application, for example, index update methods provided in embodiments shown in FIG. 3A and FIG. 3B to FIG. 5A and FIG. 5B. The database node 103 is mainly responsible for a data storage access service of the index update system, and may use a commercial database, for example, an Oracle database and a MySql database. In the large-capacity scenario, referring to FIG. 1b, the cluster deployment may be used. In a multi-tenant scenario, each piece of tenant data is stored in a specified database node, and the database node may be specified by deploying configuration information.

In a cluster scenario, the index update system may further include a load balancer 104. The load balancer 104 is mainly responsible for accepting a request (for example, a logical SQL request) from a (tenant) client, and distributing the request to an application node in an application node cluster based on a load status of each application node 101.

Coordination service: The coordination service is an open source code distributed application program coordination service, and finishes tasks such as a unified naming service, a status synchronization service, cluster management, and distributed application configuration item management. The coordination service is usually deployed on an independent coordination service node.

Figure 2A:
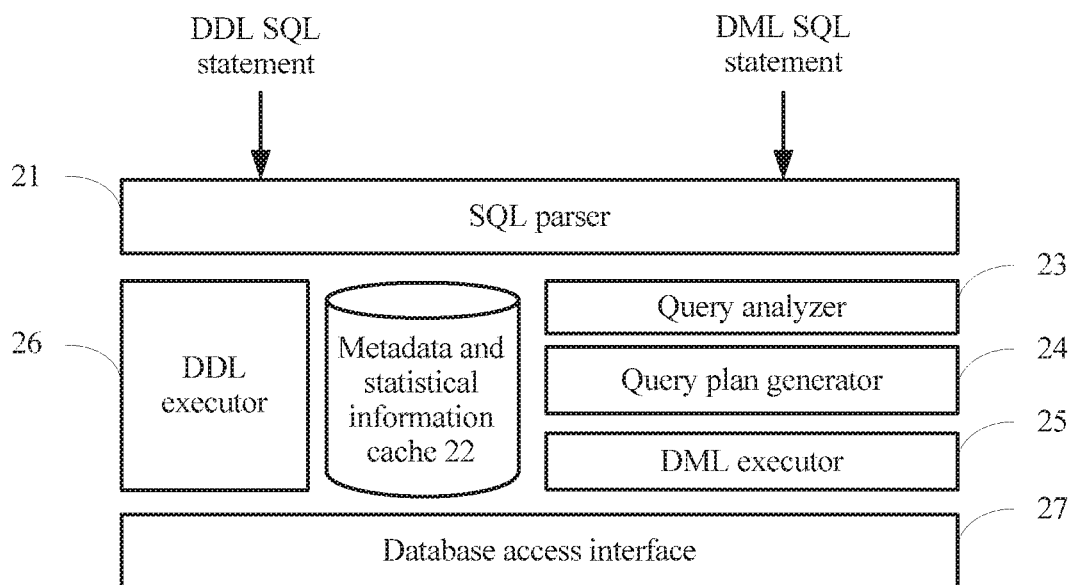
FIG. 2a is an example of a structural diagram of a data access node according to an embodiment of this application.

FIG. 2a shows an example of a structure of the foregoing data access node 102, including the following components.

An SQL parser 21 is responsible for parsing an SQL query request sent by an application node 101, and generating a syntax tree. The SQL query request herein may include a DDL SQL statement and a DML SQL statement. It should be noted that execution of the DML SQL statement is emphasized in this application. Therefore, unless otherwise specified, a subsequent SQL query request is the DML SQL statement.

A metadata and statistical information cache 22 is responsible for metadata and statistical information caching on the data access node 102, metadata is loaded from a database when a database access service is started, and statistical information is collected and stored in real time by a data access service. A query analyzer 23 is responsible for performing query analysis based on the syntax tree and the metadata and statistical information caching, to obtain a query analysis result. A query plan generator 24 may be responsible for determining the target query plan mentioned above. More specifically, when an optimal query plan is not found, the query plan generator 24 may generate the target query plan based on the query analysis result. In addition, the query plan generator 24 may further determine an alternative query plan for an SQL query request, query the database for query costs of each alternative query plan when there are a plurality of alternative query plans, and cache an alternative query plan with minimum query costs as an optimal query plan for the SQL query request. A DML executor 25 is responsible for performing the target query plan, receiving and processing a query result returned by the database, and returning the query result to the application node 101. A DDL executor 26 is responsible for executing the DDL SQL statement (a DDL request) sent by the application node 101. A database access interface 27 provides an access interface for each heterogeneous database. The foregoing update apparatus may be deployed on the data access node 102 in a form of hardware or software.

Figure 2B:
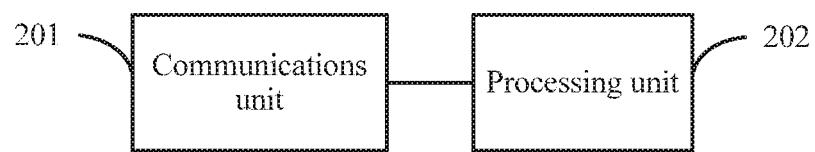
FIG. 2b is an example of a structural diagram of an update apparatus according to an embodiment of this application.

FIG. 2b shows an example of a structure of the foregoing update apparatus, and the update apparatus may include a communications unit 201 and a processing unit 202. A function of each unit is subsequently described in combination with an update method in this specification.

Figure 2C:
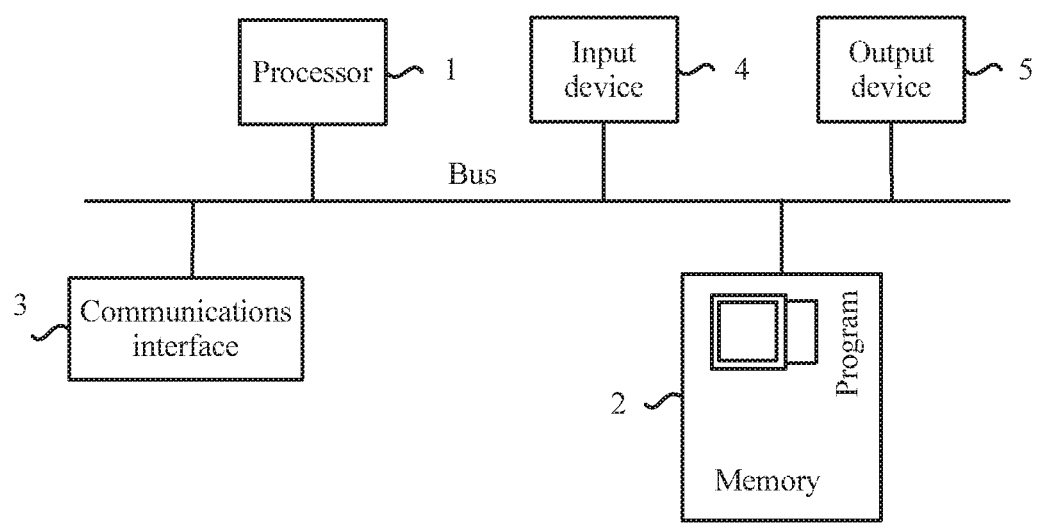
FIG. 2c is an example of a structural diagram of another update apparatus according to an embodiment of this application.

FIG. 2c shows another example of a structure of the foregoing update apparatus, including a bus, a controller/processor 1, a memory 2, and a communications interface 3. Optionally, the foregoing update apparatus may further include an input device 4 and an output device 5. The processor 1, the memory 2, the input device 4, and the output device 5 are connected to each other by using the bus. The bus may include a channel for transferring information between parts of a computer system.

The controller/processor 1 may be a general-purpose processor such as a general-purpose central processing unit (CPU), a network processor (Network Processor, NP), or a microprocessor, or may be an application-specific integrated circuit (application-specific integrated circuit, ASIC) or one or more integrated circuits that are configured to control program execution of the solutions of this application, or may be a digital signal processor (Digital Signal Processor, DSP), a field-programmable gate array (Field-Programmable Gate Array, FPGA) or another programmable logic device, a discrete gate or a transistor logic device, or a discrete hardware component. Alternatively, the controller/processor 1 may be a combination of processors implementing a computing function, for example, a combination of one or more microprocessors or a combination of the DSP and the microprocessor.

The controller/processor 1 may be configured to implement a function of the foregoing processing unit 202. The memory 2 stores programs executing the technical solutions of this application, and may also store an operating system and another application program. Specifically, the programs may include program code, and the program code includes a computer operation instruction. More specifically, the memory 2 may be a read-only memory (read-only memory, ROM), another type of static storage device that can store static information and instructions, a random access memory (random access memory, RAM), another type of dynamic storage device that can store information and instructions, a magnetic disk storage, or the like. The input device 4 may include a terminal device that receives data and information entered by a user, for example, a keyboard, a mouse, a camera, a scanner, a light pen, a voice input terminal device, and a touchscreen. The output device 5 may include a terminal device that is allowed to output information to the user, for example, a screen unit. The communications interface 3 may include a terminal device that uses any transceiver, to support the update apparatus in communicating with another device or a communications network. The communications interface 3 may be configured to implement a function of the foregoing communications unit 201.

It may be understood that FIG. 2*b* shows merely a simplified design of the update apparatus. In actual application, the update apparatus may include any quantity of transmitters, receivers, processors, controllers, memories, communications interfaces, and the like, and all update apparatus that can implement this application fall within the protection scope of this application.

The controller/processor 1 executes the programs stored in the memory 2, and invokes another device. The processor 1 may be configured to implement an index update method provided in embodiments shown in FIG. 3A and FIG. 3B to FIG. 5A and FIG. 5B.

In another embodiment of this application, the foregoing data access node 102 may also use a structure similar to that in FIG. 2*b*.

Figure 3A:
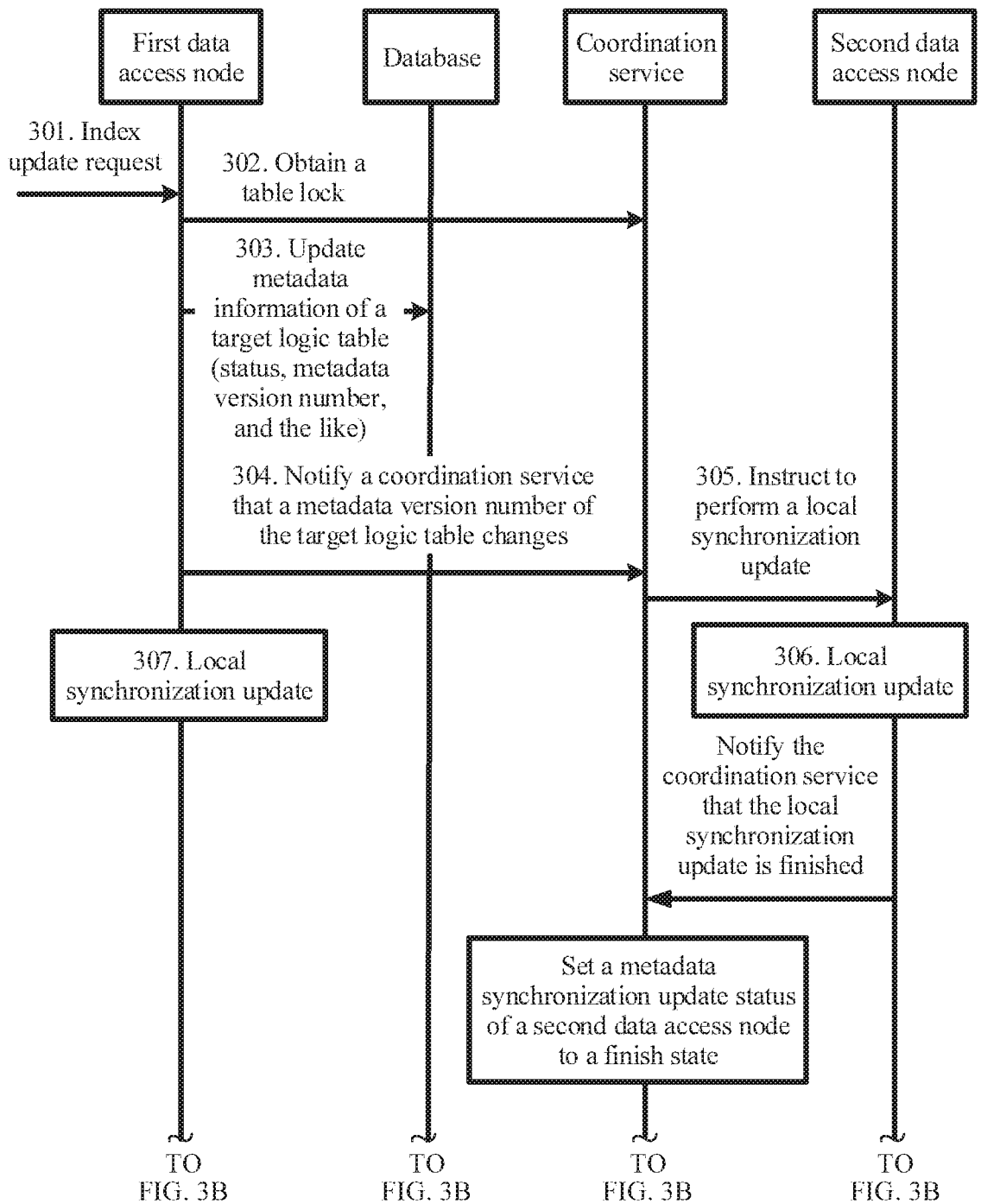
FIG. 3A and FIG. 3B are an example of a flowchart of an index update method according to an embodiment of this application.
Figure 3B:
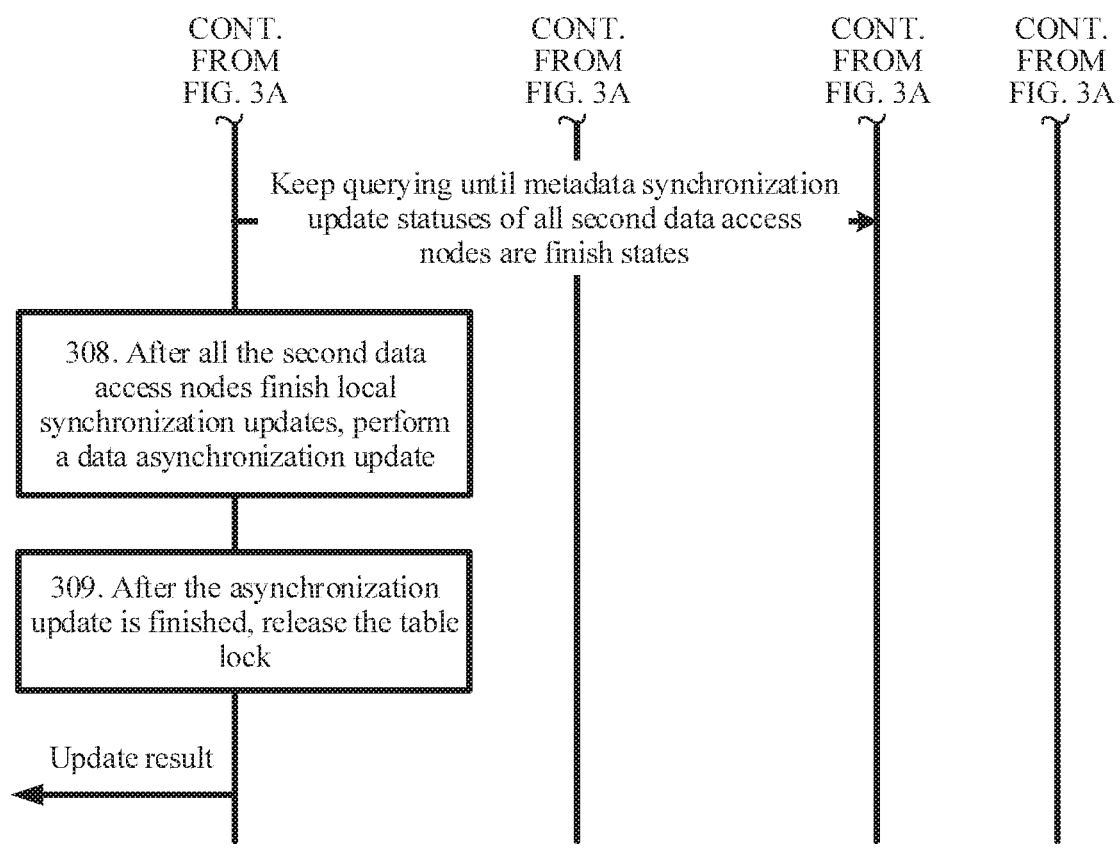

FIG. 3A and FIG. 3B show an example of an interaction procedure of the foregoing index update method, including the following steps.

S301. A user (a tenant) sends an index update request to a particular data access node 102 through a database access service of an application node 101.

In this process, the foregoing communications unit 201 may receive the index update request. The index update request may be used to instruct to create or delete a target index that is associated with a field in a logic table of the tenant. The target index is an index that the index update request instructs to create, or an index that the index update request instructs to delete. A logic table indicated in the index update request may be referred to as a target logic table.

More specifically, the user may directly write the index update request, or the application node 101 may provide a graphical interface for the user to customize and automatically generate a related index update request, and send the index update request to a data access service on the particular data access node 102, so as to trigger an index update procedure. In this manner, the tenant can independently finish an index update operation on the graphical interface provided by the application node 101.

For distinguishing, a data access node that receives the index update request may be referred to as a first data access node, and another data access node may be referred to as a second data access node.

In an example, a standard DDL SQL statement may be used as the index update request.

Creating the target index is used as an example, and syntax of the DDL SQL statement is defined as follows: CREATE [UNIQUE] INDEX INDEX_NAME ON TABLE_NAME (FIELD_NAME).

"INDEX_NAME" represents a specific index name; "TABLE_NAME" represents a specific logic table name, for example, a name of the foregoing account logic table; and FIELD_NAME represents a specific field in a logic table.

The user may specify a logic table name and a field in the index update request, and update a target index associated with the specified field. In this way, a logic table and a field may be flexibly specified, and an index is created or updated on the specified field.

S302. A first data access node adds a table lock to a target logic table.

The table lock may be used to prohibit another request from being used to perform an update operation on metadata information of a logic table. The another request herein is a request related to performing the update operation on the metadata information of the logic table. For example, in an actual operation, there may be another index update request that is also used to instruct to create or delete an index for a field on the same logic table, while the table lock may prevent a plurality of requests from being used to simultaneously update the metadata information of the same logic table, to avoid data update confusion. In an example, the table lock may be specifically a DDL lock, and the first data access node may obtain the DDL lock from a coordination service deployed on a coordination service node, to prevent different DDLs from being used to concurrently operate the metadata information of the same logic table.

In an example, step 302 may be performed by a processing unit 202 of the first data access node.

S303. The first data access node updates metadata information of the target logic table in a database.

Step 303 may be performed by the processing unit 202 of the first data access node. The processing unit 202 may instruct the communications unit 201 to submit the update request to the database, to update the metadata information of the target logic table.

The metadata information of the logic table is stored in the database, and the metadata information of the logic table is also locally cached in each data access node. In this step, an update of the metadata information of the logic table in the database is performed. In a subsequent step, each data access node also updates the metadata information of the target logic table cached locally.

Actually, this step is mainly used to update index metadata information of the target index, and the index metadata information of the target index belongs to a part of the metadata information of the target logic table. Therefore, updating the index metadata information also belongs to updating the metadata information of the target logic table.

More specifically, as mentioned above, the index update request may instruct to create or delete the target index.

For creating the index, updating the index metadata information may specifically include the following:

A: The index metadata information of the target index is stored into the database, where more specifically, the index metadata information of the target index may be stored in indexes and index_fields tables in the database; and B: A status of the target index is set to a first intermediate state. Specifically, the first intermediate state may be designed as "creating". An index in the first intermediate state cannot be cited by a query plan.

For example, it is assumed that an data object ACCOUNT of a tenant 101 stored in a flat-wide table is shown in Table 6. The index update request of the user is used to instruct to create a non-unique index on an ACCOUNT_NAME field (value0 field) of an object ACCOUNT. In this step, an index metadata table (indexes) of the target index in the database is shown in Table 13 below. "creating" of a status (status) field indicates "creating".

TABLE 13

| index_id | tenant_id | obj_id | index_name | index_type | status | create_time | delete_time |
|---|---|---|---|---|---|---|---|
| 401 | 101 | 201 | INDEX_ACCOUNT | Non-unique | creating | 00:00:00, 2016 Sep. 26 | null |

The reason that the status of the target index is set to the first intermediate state is as follows: The index metadata information of the target index is stored in the database in this case, but the target index is not really created successfully. In this case, if the query plan is allowed to cite the target index, a query fails. In addition, the first intermediate state has another function in another embodiment, and the function is subsequently described in this specification.

For deleting the index, updating the index metadata information may specifically include: setting a status of the target index to a second intermediate state. Specifically, the second intermediate state may be designed as "deleting". More specifically, a status (status) field value in an index metadata table may be set to "deleting", indicating "deleting". An index in the second intermediate state cannot be cited by a query plan, either. The status of the target index is set to the second intermediate state to prevent the query plan from citing an index to be deleted.

C: Whether deleting or creating an index, the first data access node updates a metadata version number of the target logic table in the database. For example, the metadata version number of the target logic table may be updated from previous V1 to V2.

S304. The first data access node notifies a coordination service that the metadata information of the target logic table is changed.

More specifically, the coordination service may be notified that the metadata version number of the target logic table is changed. Step 304 may be performed by the communications unit 201 under an instruction of the processing unit 202 of the first data access node.

S305. The coordination service notifies a second data access node to perform a local synchronization update on the metadata information of the target logic table.

More specifically, a data access service deployed on each second data access node listens to a metadata change notification of the coordination service. When the metadata change notification is obtained through listening, the local synchronization update is performed. There are a plurality of listening mechanisms, and the listening mechanisms are provided by the coordination service and not discussed in detail in this solution.

S306. (A data access service on) the second data access node performs the local synchronization update on the metadata information of the target logic table.

In an example, the "local synchronization update" may include at least the following steps.

A: Refresh the metadata information of the target logic table cached locally.

A specific implementation of the refreshing may be: replacing the metadata information of the target logic table cached locally with the metadata information of the target logic table in the database. It should be noted that, before the refreshing, the locally cached metadata version number of the target logic table of each data access node is still V1. After the refreshing, the metadata version number of the target logic table is V2.

B: Obtain a current transaction list.

A transaction in the current transaction list is an ongoing transaction.

C: Wait for all transactions in the current transaction list to end (normally end or end due to expiration).

Notifying the coordination service after the transactions in the current transaction list end may ensure that a current transaction (an ongoing data operation) is not affected and improve use experience of the user. In an example, after all the transactions in the current transaction list end, the second data access node may notify the coordination service that the local synchronization update is finished. The coordination service may set a metadata synchronization update status of the second data access node to a finish state according to a notification of the second data access node. More specifically, the coordination service may maintain an update status list, set, to 1, a status value of a second data access node that has finished a metadata synchronization update in the list, and set, to 0, a status value of a second data access node that has not notified the coordination service.

It should be noted that the transaction uses the query plan, and the query plan is generated based on the metadata information of the logic table. If a query plan is generated based on metadata information of a particular logic table, it may be considered that the query plan is associated with the logic table. For example, in response to a query request, a particular data access node needs to query a logic table A, a query plan is generated based on metadata information of the logic table A (in other words, a query plan associated with the logic table A is generated).

In addition, after a query ends, the data access node locally caches the generated query plan, so that the data access node can directly use the query plan when receiving the same query request, to improve query efficiency.

Therefore, generally, each data access node locally caches a plurality of query plans, and it may be considered that the data access node maintains a query plan pool. It is assumed that before the metadata information of the target logic table is updated, the metadata version number of the target logic table is V1, and an updated metadata version number is V2.

Apparently, before the foregoing operation A is performed, a query plan that is associated with the target logic table and that is cached by each data access node is generated based on old metadata information of the target logic table (the query plan generated based on the old metadata information may be referred to as an old query plan). Alternatively, the old query plan is generated based on metadata information of a V1 version. A query plan that is associated with the target logic table and that is used by an ongoing transaction in the current transaction list is also based on the V1 version.

Because an index is updated online, each data access node may receive a new query request. To prevent a new SQL query request from using the old query plan, in an example, the foregoing "local synchronization update" may further include the following operation: setting a locally cached query plan (usually an SQL execution plan) associated with the target logic table to an invalid state.

In other words, the old query plan is made invalid. It should be noted that, although the old query plan is made invalid, the transactions in the current transaction list can still use the old query plan while the new query request cannot use the old query plan.

In addition, the data access node may generate a query plan based on new version metadata information (the query plan generated based on the new version metadata information may be referred to as a new query plan for short). The new SQL query request may use the new query plan.

In addition, it should be noted that the query plan is finally converted into an operation on a tenant data record in the flat-wide table.

Referring to Table 6, a metadata version number of a corresponding logic table is stored in each tenant data record. After an operation, the metadata version number in the tenant data record is updated to a metadata version number on which the query plan is based.

Table 6 is used as an example. It is assumed that data in a first tenant data record is changed by the old query plan, and a version field value of the first tenant data record is still V1. However, data in a third and fourth tenant data records is changed by the new query plan, and version field values of the third and fourth tenant data records are updated to V2. Updated tenant data records are shown in Table 14 below.

operations such as refreshing the metadata information of the target logic table cached locally, waiting for all the transactions in the current transaction list to end, and setting the locally cached query plan associated with the target logic table to the invalid state. After all the transactions in the current transaction list end, whether to notify the coordination service may be flexibly designed. The first data access node may be designed to notify the coordination service after completing the local synchronization update, or may be designed not to notify the coordination service.

Step 307 may be performed by the processing unit 202 of the first data access node, and the processing unit 202 of the first data access node may instruct the communications unit 201 of the first data access node to notify the coordination service.

S308. After all second data access nodes finish local synchronization updates, the first data access node performs a data asynchronization update.

In an example, the first data access node may keep querying the coordination service for the metadata synchronization update status of the second data access node until metadata synchronization update statuses of all the second data access nodes are finish states, and then perform the data asynchronization update. Certainly, in another embodiment, one of the second data access nodes may alternatively perform a data asynchronization update. The data asynchronization update includes at least: creating the target index according to the index update request, or deleting the target index according to the index update request. How to perform the data asynchronization update for two cases of creation and deletion is subsequently described in detail in this specification. The first data access node may start an asynchronization task to perform the asynchronization update.

S309. After finishing the asynchronization update, the first data access node releases the table lock. After the asynchronization update is finished, index creation or deletion is finished. Therefore, the table lock may be released.

In another instance of the present invention, after finishing the asynchronization update, the first data access node

TABLE 14

| tenant_id | obj_id | Guid | version | delete-time | value 0 | value 1 | value 2 |
|---|---|---|---|---|---|---|---|
| 101 | 201 | 1000001 | V1 | Null | ACCID_1 | Tom | Nanjing |
| 101 | 201 | 1000002 | V1 | Null | ACCID_2 | Jack | Shanghai |
| 101 | 201 | 1000003 | V2 | Null | ACCID_3 | Mary | Beijing |
| 101 | 201 | 1000004 | V2 | Null | ACCID_4 | Penny | Hongkong |

For newly creating the target index, because there is no related information about the target index in an old version at all, tenant data changed by the old query plan cannot be synchronized to an index pivot table, and synchronization may be finished in subsequent data asynchronization. However, tenant data changed by the new query plan can be synchronized to the index pivot table.

Step 306 may be performed by a processing unit 202 of the second data access node, and the processing unit 202 of the second data access node may instruct a communications unit 201 of the second data access node to notify the coordination service.

S307. The first data access node performs a local synchronization update on the metadata information of the target logic table.

Similar to the second data access node, the first data access node also needs to perform the local synchronization update. Therefore, the first data access node also performs may return an update result to a corresponding application node. More specifically, the update result may include information indicating whether the update is success or fail. Certainly, if the update fails, the update result may further include a failure cause.

Steps 308 and 309 may be performed by the communications unit 201 under an instruction of the processing unit 202 of the first data access node.

It can be learned that in the solution provided in this application, after the metadata information is updated in the database, an index is updated in two steps: In a first step, each data access node performs a local synchronization update on the metadata information of the logic table, and in the local synchronization update, waits for the transactions in the current transaction list to end. In this way, execution of a current transaction may not be affected. After the local synchronization update, a subsequent data access request of each data access node for the logic table may be based on new metadata information. In a second step, after all the data access nodes finish the local synchronization updates, a data asynchronization update is performed to create or delete the target index. The index can be updated online in real time through the foregoing two-step update, and in addition, it can be further ensured that an ongoing data operation of the current transaction is not affected, to improve use experience of the user.

Steps of creating an index and deleting an index are described below with more detailed examples.

Figure 4A:
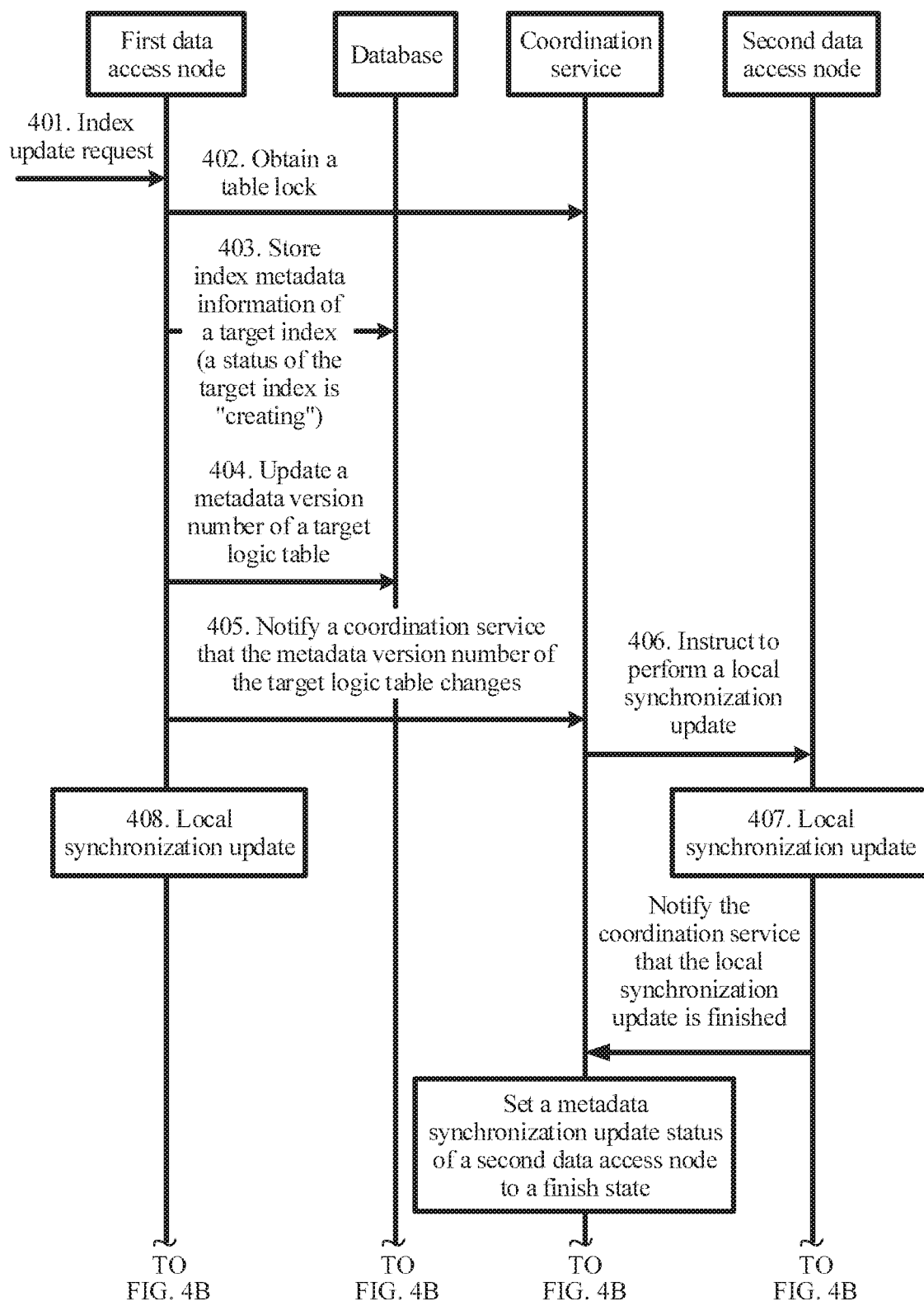
FIG. 4A and FIG. 4B are an example of a flowchart of another index update method according to an embodiment of this application.
Figure 4B:
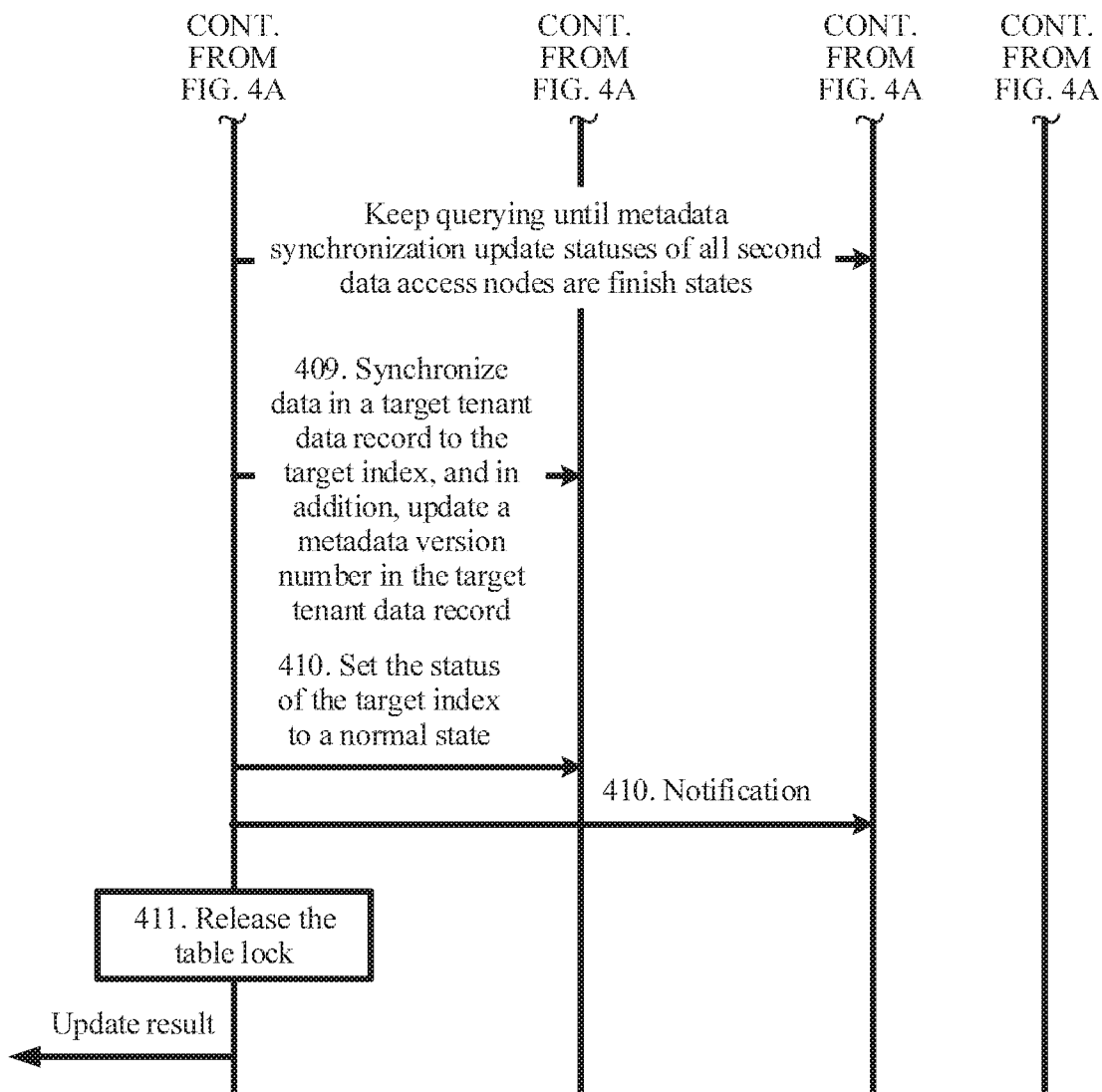

FIG. 4A and FIG. 4B show an example of an interaction procedure of the foregoing index update method when a target index is created. The method includes the following steps.

S401 and S402 are the same as S301 and S302, and details are not described herein again.

S403. The first data access node stores index metadata information of a target index into a database, and a status of the target index is set to "creating" (a first intermediate state). For a related description, refer to the foregoing part S303. Details are not described herein again.

S404. The first data access node updates a metadata version number of a target logic table in the database. For example, the metadata version number of the target logic table may be updated from previous V1 to V2.

associated with the logic table. For example, it is assumed that the metadata version number of the target logic table is updated from previous V1 to V2. Referring to Table 14, if the metadata version number of the tenant data record is V2, it indicates that the record has been updated to an index pivot table, and in the asynchronization task, no operation is performed on the record. If the metadata version number of the tenant data record is not V2, it indicates that the tenant data record is not updated to the index pivot table. To be specific, in Table 14, there are two tenant data records of which metadata version number is V1, and the two tenant data records are target tenant data records.

In the asynchronization task of the first data access node, field values related to the target index in the two tenant data records of which the metadata version number is V1 in Table 14 are updated to the index pivot table. It is assumed that a field associated with the target index is "value0" in Table 14, and ACCID_1 and ACCID_2 in Table 14 are updated to the index pivot table. An updated index pivot table is shown in Table 15 below. In addition, in the asynchronization task, the metadata version numbers of the two tenant data records are further changed, to identify that the two tenant data records have been updated by using new metadata, and changed tenant data records are shown in Table 16 below.

TABLE 15

| tenant_id | obj_id | field_num | Guid | string_value | num_value | date_value |
|---|---|---|---|---|---|---|
| 101 | 201 | 0 | 1000001 | ACCID_1 | Null | Null |
| 101 | 201 | 0 | 1000002 | ACCID_2 | Null | Null |
| 101 | 201 | 0 | 1000003 | ACCID_3 | Null | Null |
| 101 | 201 | 0 | 1000004 | ACCID_4 | Null | Null |

TABLE 16

| tenant_id | obj_id | Guid | version | delete_time | value 0 | value 1 | value 2 |
|---|---|---|---|---|---|---|---|
| 101 | 201 | 1000001 | V2 | Null | ACCID_1 | Tom | Nanjing |
| 101 | 201 | 1000002 | V2 | Null | ACCID_2 | Jack | Shanghai |
| 101 | 201 | 1000003 | V2 | Null | ACCID_3 | Mary | Beijing |
| 101 | 201 | 1000004 | V2 | Null | ACCID_4 | Penny | Hongkong |

S405 to S408 are the same as S304 to S307, and details are not described herein again.

S409. The first data access node queries a tenant data record associated with the target logic table in a flat-wide table, synchronizes data in a target tenant data record to the target index, and in addition, updates a metadata version number in the target tenant data record.

A data asynchronization update is started from S409. The first data access node may start an asynchronization task to perform the data asynchronization update.

In the asynchronization task, a specific index on which an asynchronization update needs to be performed may be determined based on the status. Because the status of the target index is currently "creating", it may be determined, in the asynchronization task based on the status of the target index, that an asynchronization update needs to be performed on the target index. Certainly, in another example, a table may be alternatively created, to record to-be-created and to-be-deleted indexes.

The target tenant data record includes a tenant data record whose metadata version number is not updated and that is In an example, to prevent the asynchronization task and a normal DML from being used to simultaneously operate a particular tenant data record, in the asynchronization task, SELECT FOR UPDATE may be used to add a row lock to the tenant data record. SELECT FOR UPDATE is a standard DML statement that is used to add the row lock to the record.

S410. The first data access node sets the status of the target index in the database to a normal state, and notifies a coordination service.

When a related tenant data record whose version number is less than V2 cannot be found in the asynchronization task, it indicates that all tenant data records related to the target logic table have been updated by using new version metadata information, and the asynchronization task of index creation is finished. An index metadata table of the target index shown in Table 13 is used as an example. After the status is changed, an index metadata table of the target index is shown in Table 17 below. "Normal" of a status (status) field indicates "normal".

TABLE 17

| index_id | tenant_id | obj_id | index_name | index_type | status | create_time | delete_time |
|---|---|---|---|---|---|---|---|
| 401 | 101 | 201 | INDEX_ACCOUNT | Non-unique | Normal | 00:00:00, 2016 Sep. 26 | null |

When the coordination service is notified, the coordination service may be notified that the status of the target index is updated, or the coordination service may be notified that metadata information of the target logic table is updated. The coordination service may instruct a second data access node again to refresh the metadata information of the target logic table cached locally again, or refresh only the status of the target index cached locally. In this refreshing, step B and step C in a local synchronization update may not be performed. In another embodiment of this application, a quantity of index records that are updated or deleted each time may be limited. For example, a maximum quantity of index records that are updated or deleted each time may be limited to 1000. In each operation in the asynchronization task, 1,000 index records can be updated. If an upper limit of 1,000 is reached, a same operation is performed again. This considers that a log needs to be generated during each update. If there are a large quantity of records for updating data, a quantity of logs is also large, affecting performance. Likewise, a maximum quantity of tenant data records that are updated each time in the flat-wide table may also be limited, and details are not described herein.

S411. After completing an asynchronization update, the first data access node releases the table lock.

S411 is the same as S309, and details are not described herein again.

S411 and S410 may be simultaneously performed, or may be successively performed.

Steps 409 to 411 may be performed by a communications unit 201 under an instruction of a processing unit 202 of the first data access node.

Figure 5A:
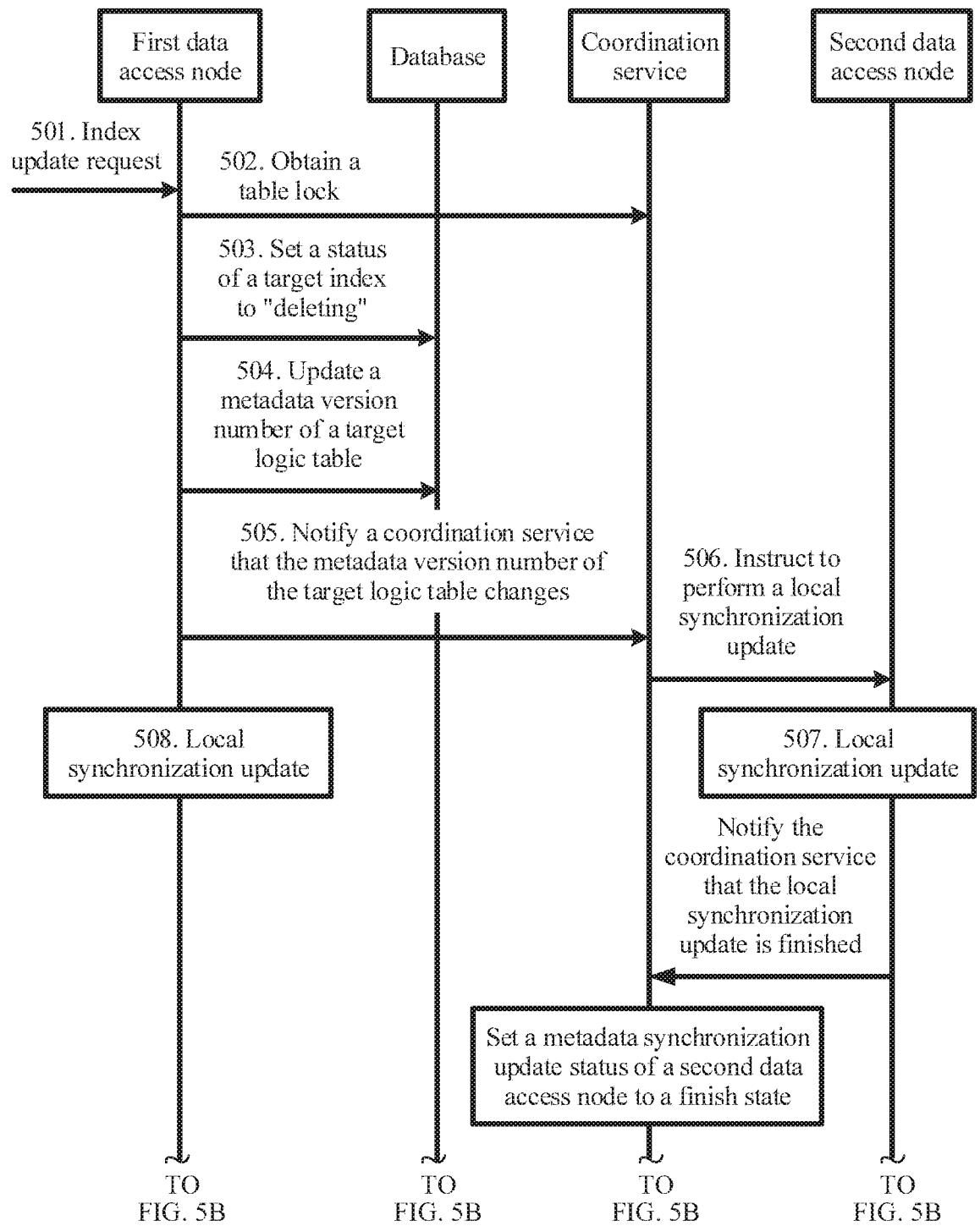
FIG. 5A and FIG. 5B are an example of a flowchart of another index update method according to an embodiment of this application.
Figure 5B:
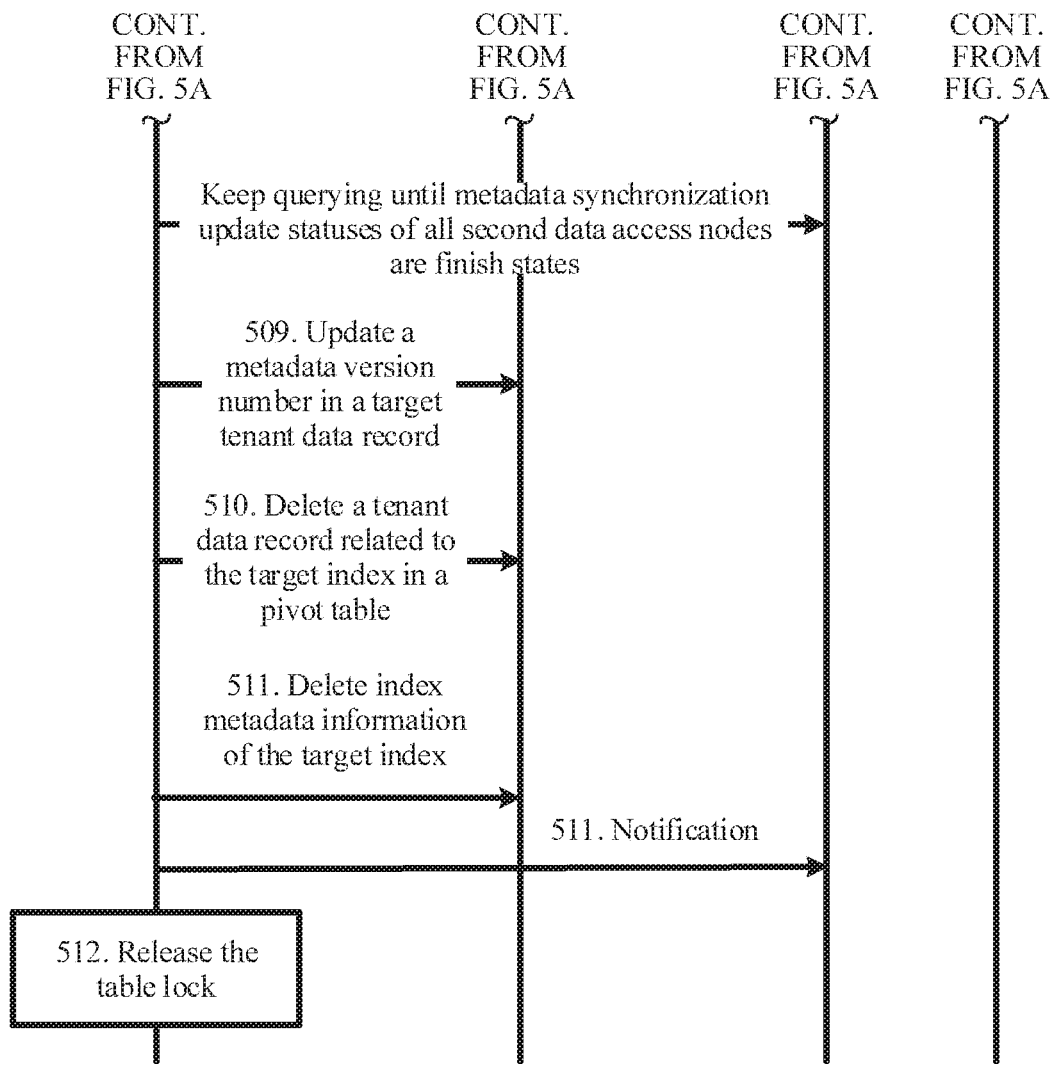

FIG. 5A and FIG. 5B show an example of an interaction procedure of the foregoing index update method when a target index is deleted. The method includes the following steps.

S501 and S502 are the same as S401 and S402 or S301 and S302, and details are not described herein again.

S503. The first data access node sets a status of a target index in a database to "deleting" (a second intermediate state). For a related description, refer to the foregoing part S303. Details are not described herein again.

S504. The first data access node updates a metadata version number of a target logic table in the database. For example, the metadata version number of the target logic table may be updated from previous V1 to V2.

S505 to S508 are the same as S405 to S408 or S304 to S307, and details are not described herein again.

S509. The first data access node queries a tenant data record associated with the target logic table in a flat-wide table, and updates a metadata version number in a target tenant data record.

For example, it is assumed that the metadata version number of the target logic table is updated from previous V1 to V2. Referring to Table 14, metadata version numbers of all tenant data records associated with the target logic table may be updated to V2. Because in this embodiment, the target index needs to be deleted, data in the target logic table does not need to be synchronized to the target index.

A data asynchronization update is started from S509. The first data access node may start an asynchronization task to perform the data asynchronization update.

In the asynchronization task, a specific index on which an asynchronization update needs to be performed may be determined based on the status. Because the status of the target index is currently "deleting", it may be determined, in the asynchronization task based on the status of the target index, that an asynchronization update needs to be performed on the target index. In an example, to prevent the asynchronization task and a normal DML from being used to simultaneously operate a particular tenant data record, in the asynchronization task, SELECT FOR UPDATE may be used to add a row lock to the tenant data record. SELECT FOR UPDATE is a standard DML statement that is used to add the row lock to the record.

S510. The first data access node deletes a tenant data record related to the target index in a pivot table.

It is assumed that the pivot table is shown in Table 18 below, and a "num_value" field is associated with the target index. When the target index is deleted, tenant data in the "num_value" field is deleted. After deletion, a pivot table is shown in Table 19 below.

TABLE 18

| tenant_id | obj_id | field_num | Guid | string_value | num_value | date_value |
|---|---|---|---|---|---|---|
| 101 | 201 | 0 | 1000001 | ACCID_1 | 01 | Null |
| 101 | 201 | 0 | 1000002 | ACCID_2 | 02 | Null |
| 101 | 201 | 0 | 1000003 | ACCID_3 | 03 | Null |
| 101 | 201 | 0 | 1000004 | ACCID_4 | 04 | Null |

TABLE 19

| tenant_id | obj_id | field_num | Guid | string_value | num_value | date_value |
|---|---|---|---|---|---|---|
| 101 | 201 | 0 | 1000001 | ACCID_1 | Null | Null |
| 101 | 201 | 0 | 1000002 | ACCID_2 | Null | Null |
| 101 | 201 | 0 | 1000003 | ACCID_3 | Null | Null |
| 101 | 201 | 0 | 1000004 | ACCID_4 | Null | Null |

After there is no tenant data associated with the target index in an index pivot table to be deleted, an asynchronization task of index deletion is finished.

S511. The first data access node deletes index metadata information of the target index in the database, and notifies a coordination service that metadata information of the target logic table is updated.

The coordination service may instruct a second data access node to refresh the metadata information of the target logic table cached locally again. In this refreshing, step B and step C in a local synchronization update may not be performed.

S512. After completing an asynchronization update, the first data access node releases the table lock.

S511 and S512 may be simultaneously performed, or may be successively performed.

Steps 509 to 512 may be perfomed by a communications unit 201 under an instruction of a processing unit 202 of the first data access node.

In another embodiment of this application, a status query interface for a data asynchronization update may be further provided, and a user may query index update progress. In addition, a query display interface for displaying selectivity of a field of a logic table may be further provided. Before creating an index, a tenant can query a field of the logic table through the query display interface, to display a quantity of different values of the field. If there are many different values of the field, it indicates that selectivity is good. If there are few different values, selectivity is poor. The user can make reference to this, to more effectively assist the tenant in completing index creation.

Method or algorithm steps described in combination with the content disclosed in this application may be implemented by hardware, or may be implemented by a processor by executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. When the present invention is implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. An index update method applied to a first data access node, the index update method comprising:
   receiving an index update request, wherein the index update request instructs the first data access node to create or delete a target index that is associated with a field in a logic table of a tenant;
   updating metadata information of the logic table in a database in response to receiving the index update request, wherein the database comprises updated metadata information of the logic table after the first data access node updates the metadata information;
   sending a notification notifying a coordination service that the metadata information of the logic table is changed, wherein the notification is configured to prompt the coordination service to notify a second data access node to perform a second local synchronization update on second metadata information corresponding to the metadata information of the logic table in the database, wherein the second metadata information is locally cached in the second data access node;
   performing a first local synchronization update on first metadata information corresponding to the metadata information of the logic table in the database wherein the first metadata information is locally cached in the first data access node; and
   performing a data asynchronization update after the second data access node finishes the second local synchronization update, wherein when the index update request instructs creating the target index, performing the data asynchronization update comprises setting a status of the target index in the database to a normal state after metadata version numbers in all target tenant data records are updated.

2. The index update method according to claim 1, wherein after the index update request is received and before the metadata information is updated, the index update method further comprises:
   adding a table lock to the logic table in the database, wherein the table lock is configured to prohibit another request from simultaneously performing an update operation on the metadata information of the logic table in the database; and
   releasing the table lock after the data asynchronization update is finished.

3. The index update method according to claim 1, wherein performing the first local synchronization update at least comprises:
   refreshing the first metadata information to generate first updated metadata information in synch with the updated metadata information of the logic table in the database, wherein the first metadata information is locally cached in a first database of the first data access node before being refreshed by the first data access node, and wherein the first metadata information in the first database is replaced with the first updated metadata information after being refreshed by the first data access node; and
   notifying the coordination service that the first local synchronization update is finished after all transactions in a current transaction list end.

4. The index update method according to claim 3, wherein performing the first local synchronization update further comprises setting a query plan associated with the logic table to an invalid state.

5. The index update method according to claim 1, wherein performing the data asynchronization update comprises creating or deleting the target index in real time according to the index update request.

6. The index update method according to claim 1, wherein updating the metadata information of the logic table in the database comprises updating a metadata version number of the logic table in the database.

7. The index update method according to claim 6, wherein updating the metadata information of the logic table in the database further comprises storing index metadata information of the target index into the database when the index update request instructs the first data access node to create the target index, wherein a first status of the target index in the index metadata information is a first intermediate state, wherein updating the metadata information of the logic table in the database further comprises setting a second status of the target index in the database to a second intermediate state when the index update request instructs the first data access node to delete the target index, and wherein an index whose status is the first intermediate state or the second intermediate state is not available for use by a query plan.

8. The index update method according to claim 7, wherein creating the target index comprises:
   querying a tenant data record associated with the logic table in a flat-wide table; and
   synchronizing data in a target tenant data record to the target index, wherein the target tenant data record comprises a tenant data record whose metadata version number is not updated and that is associated with the logic table.

9. The index update method according to claim 8, further comprising updating the metadata version number in the target tenant data record after creating or deleting the target index.

10. The index update method according to claim 9, wherein the coordination service notifies the second data access node to refresh the second metadata information by replacing the second metadata information with the updated metadata information of the logic table in the database, and wherein the second metadata information is cached locally in a second database of the second data access node.

11. An index update apparatus, comprising:
   a communication interface configured to receive an index update request from a tenant in a multi-tenant architecture, wherein the index update request instructs the index update apparatus to create or delete a target index that is associated with a field in a logic table of the tenant;
   a processor coupled to the communication interface; and
   a memory configured to store program instruction executable by the processor to:
      update metadata information of the logic table in a database in response to receiving the index update request, wherein the database comprises updated metadata information of the logic table after the index update apparatus updates the metadata information;
      send a notification to notify a coordination service that the metadata information of the logic table is changed, wherein the coordination service is configured to notify a second data access node to perform a second local synchronization update on second metadata information corresponding to the metadata information of the logic table in the database, and wherein the second metadata information is locally cached in the second data access node;
      perform a first local synchronization update on first metadata information corresponding to the metadata information of the logic table in the database, wherein the first metadata information is locally cached in the index update apparatus;
      perform a data asynchronization update after the second data access node finishes the second local synchronization update;
      seta status of the target index in the database to a normal state when the index update ret rest instructs creating the target index; and
      notify the coordination service after metadata version numbers in all target tenant data records are updated.

12. The index update apparatus according to claim 11, wherein in performing the first local synchronization update on the first metadata information table, the processor executes the program instruction to:
   refresh the first metadata information such that the first metadata information is synched with the updated metadata information of the logic table in the database, wherein the first metadata information is cached locally in a first database of the index update apparatus; and
   notify the coordination service that the first local synchronization update is finished after all transactions in a current transaction list end.

13. The index update apparatus according to claim 11, wherein in performing the first local synchronization update on the first metadata information, the processor executes the program instruction to set a query plan associated with the logic table to an invalid state.

14. The index update apparatus according to claim 11, wherein in performing the data asynchronization update, the processor executes the program instruction to create or delete the target index according to the index update request.

15. The index update apparatus according to claim 11, wherein in updating the metadata information of the logic table in the database, the processor executes the program instruction to update a metadata version number of the logic table in the database.

16. The index update apparatus according to claim 15, wherein the processor executes the program instruction to store index metadata information of the target index into the database when the index update request instructs creating the target index, wherein a first status of the target index in the index metadata information is a first intermediate state, wherein the processor executes the program instruction to set a second status of the target index in the database to a second intermediate state when the index update request instructs deleting the target index, and wherein an index whose status is the first intermediate state or the second intermediate state is not available for a query plan.

17. The index update apparatus according to claim 16, wherein in creating the target index, the processor executes the program instruction to:
   query a tenant data record associated with the logic table in a flat-wide table; and
   synchronize data in a target tenant data record to the target index, wherein the target tenant data record comprises a tenant data record whose metadata version number is not updated and that is associated with the logic table.

18. The index update apparatus according to claim 17, wherein in performing the data asynchronization update, the processor executes the program instruction to update a metadata version number in the target tenant data record after creating or deleting the target index.

19. The index update apparatus according to claim 18, wherein the processor executes the program instruction to update the target index in real time when performing the data asynchronization update.

20. The index update apparatus according to claim 18, wherein the coordination service further notifies the second data access node to refresh the second metadata information such that the second metadata information is synced with the updated metadata information of the logic table in the database, and wherein the second metadata information is cached locally in a second database of the second data access node.

\* \* \* \* \*